United States Patent [19]

Cleary

[11] 3,992,359
[45] Nov. 16, 1976

[54] ALKALI METAL HYDROXIDE AND PHENOL SULFONATE DYEABILITY ADDITIVE IN POLYESTERIFICATION PROCESS

[75] Inventor: James W. Cleary, Bartlesville, Okla.

[73] Assignee: Phillips Petroleum Company, Bartlesville, Okla.

[22] Filed: Sept. 3, 1974

[21] Appl. No.: 502,856

[52] U.S. Cl. .................................. 260/75 S; 260/49
[51] Int. Cl.² ........................................ C08G 63/68
[58] Field of Search ............................ 260/75 S, 49

[56] References Cited
UNITED STATES PATENTS 3,541,050  11/1970  Tanaka et al. ...................... 260/49

*Primary Examiner* — Lucille M. Phynes

[57] ABSTRACT

A polyesterification process, in which a phenolsulfonate dyeability component is present, is carried out in the additional presence of a minor quantity of an alkali metal hydroxide such as sodium hydroxide.

10 Claims, No Drawings

ALKALI METAL HYDROXIDE AND PHENOL SULFONATE DYEABILITY ADDITIVE IN POLYESTERIFICATION PROCESS

BACKGROUND OF THE INVENTION

This invention relates to the incorporation of a dye acceptor into a polyester.

Synthetic fibers and films, such as those made from polyesters among others, have found a very wide utility in recent years. In the continuing improvement of such materials, there is a need for improving the dyeability of polyesters to enhance their value in the form of fibers and fabrics prepared therefrom.

The incorporation of some form of a dye acceptor has generally been found necessary to produce easily and satisfactorily dyed polyester fibers. However, the incorporation of a given material to provide this function runs the risk of disturbing other properties of the polyester such that a modified polyester composition may have been simultaneously rendered more dyeable, but less suitable for fiber formation. Indeed, the incorporation of some dye acceptors have caused a deterioration of polymer properties such as color, molecular weight, melting point, glycol ether content, and the like. Fibers, spun from such polymers, have suffered correspondingly.

A class of dyeability-additives typified by sodium p-phenolsulfonate is such an additive in point. This additive dramatically improves the dyeability of polyester with basic dyes but substantially reduces the suitability of the polyester for spinning into fibers.

SUMMARY OF THE INVENTION

It is an object of this invention to overcome the polymer-deteriorating effects of phenol-sulfonate dyeability improving additives while essentially retaining all of the dyeability-improving advantages;

it is yet a further object of this invention to provide a dyeable polyester having good physical properties;

it is yet a further object of this invention to provide a dyeable polyester having good color characteristics; and it is still yet a further object of this invention to provide a dyeable polyester having a relatively high inherent viscosity.

In accordance with this invention, a polyesterification process is carried out wherein a phenol-sulfonate dyeability component is present during at least a portion of the esterification process, there being present in addition a minor quantity of an alkali metal hydroxide such as sodium hydroxide.

DESCRIPTION OF THE PREFERRED EMBODIMENTS

The dye acceptors which are suitable for use in the process of the present invention can be represented by a formula

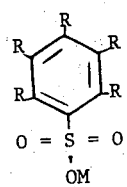

wherein M is an alkali metal and wherein R is selected from hydrogen, hydroxyl or alkyl radicals containing from one to five carbon atoms; and wherein one and only one R is hydroxyl group.

The dye-acceptor, sodium p-phenolsulfonate, has been demonstrated to respond to the process of the present invention. The artisan will recognize, however, that other closely related compounds within the generic formula shown above can also be expected to be effective in the present invention because of similar structure and similar properties. Thus, other examples of suitable phenolsulfonate compounds can be potassium m-phenolsulfonate, lithium o-phenolsulfonate, sodium 3,5-dimethyl-4-hydroxy benzenesulfonate, sodium 3-hydroxy-4-n-amylbenzenesulfonate, potassium 2-methyl-4-hydroxy-5-isobutylbenzenesulfonate, sodium 2,3,5,6-tetramethyl-4-hydroxybenzenesulfonate, and the like, and mixtures thereof.

The amount in which the phenolsulfonate dye-acceptor is employed in preparing the dyeable linear polyesters can be any effective dye receptivity improving amount and is generally from about 0.1 to about 6 mole per cent, preferably from 1 to about 4 mole per cent, based upon the total amount of moles of the dicarboxylic acid comonomer or its ester forming derivative and the phenolsulfonate modifier.

The benefits of the invention have been demonstrated in a polyesterification reaction employing dimethylterephthalate and ethylene glycol. However, those skilled in the polyester art will recognize that other related dicarboxylic acids and diol comonomers can also be used. Generally speaking, with respect to the diacids, any polyester-forming dicarboxylic acid, or its ester-forming derivative such as a dimethyl ester of a dicarboxylic acid, is suitable. Aromatic diacids are by far preferred and comonomers such as terephthalic acid or dimethyl terephthalate are particularly suitable.

With respect to applicable diols, the invention process can utilize, in general, any polyester-forming diol with aliphatic glycols being preferred, particularly glycols containing from two to about 10 carbon atoms per molecule. Ethylene glycol is particularly effective. Suitable monomers or comonomers for polyesterification reactions are well-known in the polyester art and need not be further defined.

In preparing the dyeable linear polyester of the present invention, the initial molar ratio of diol to dicarboxylic acid or ester will generally be in the range of 1.3:1 to 7:1, preferably 2:1 to 4:1.

The applicable alkali metal hydroxides suitable for use in the present invention are selected from the hydroxides of lithium, sodium, potassium, rubidium, and cesium, or mixtures thereof. Because of its ready availability and economy, sodium hydroxide is presently preferred.

The amount of alkali metal hydroxide utilized in the present process will depend upon the amount of the phenolsulfonate dye acceptor present in the polyesterification zone and can be any effective viscosity-modifying amount. Generally from about 4 to about 40, preferably from about 5 to about 20 equivalent per cent of the sulfonates present will be employed. That is, 4–40, preferably 5–20, mole equivalents of hydroxide per 100 mole equivalents of the sulfonate compound are employed.

The polyesterification procedure which is applicable for use in the present invention is that procedure which is well known in the polyester art. Generally speaking, a free dicarboxylic acid and a glycol, for example, are heated together at temperatures up to about 300° C, under conditions such that excess glycol is removed, until the polyesterification is essentially complete. Alternatively, a dicarboxylic acid ester is employed as a reactant and the reaction mixture heated at a temperature of about 150° to about 270° C to affect an initial ester interchange reaction. For example, if dimethyl terephthalate is used, methyl alcohol is evolved during this period. The reaction mixture is then further heated to complete the polycondensation and to evolve excess glycol from the reaction mixture. Temperatures during this period can range from about 200° to about 325° C.

The polycondensation is preferably carried out under a reduced pressure to promote the evolution of volatile material. If desired, however, the entire reaction can be carried out at atmospheric pressure while bubbling a stream of inert gas through the reaction mixture. The total reaction period can be from about 1 to about 12 hours, according to the catalyst employed in its concentration, the temperature, the pressure, the starting comonomers, the desired viscosity for the polyester product, etc., as is well known in the art.

The phenolsulfonate dyeability additive and the alkali metal hydroxide can be added to the initial comonomer charge within the reactor. Alternatively, when dicarboxylic acid esters are employed as reactants, the addition of either or both the alkali metal hydroxide or phenolsulfonate can be delayed until the transesterification is essentially complete and before the polycondensation stage of the reaction has substantially begun. The alkali metal hydroxide and phenolsulfonate can be introduced into the reaction zone as essentially pure materials or as solutions, solutions in lower alcohols or glycols being particularly convenient.

The polyesterification is carried out in the presence of a suitable catalyst in order to shorten the reaction period. Any of the well-known polyesterification catalysts can be used such as antimony oxide, zinc acetate, manganese acetate, cobaltous acetate, and the like. Some of these catalysts, such as zinc acetate are particularly effective in promoting the transesterification reaction when dicarboxylic acid esters are employed as comonomers. Other catalysts, such as antimony oxide, are particularly effective in promoting the polycondensation reaction which produces the high molecular weight polyester. Consequently, more than one catalyst can be utilized in the reaction zone.

It has sometimes been found beneficial, when using a combination of zinc acetate and antimony trioxide catalyst, to introduce a minor amount of a material such as tris(nonylphenyl) phosphite at the conclusion of the transesterification stage of the reaction in order to deactivate the zinc catalyst and prevent it from interfering with the antimony trioxide catalyst during the polycondensation phase.

The concentration of these catalyst materials can be varied from about 0.001 to about 1 per cent by weight based upon the total amount of dicarboxylic acid comonomer charged into the reactor. The preferred amount is from about 0.01 to about 0.5 per cent by weight of catalyst. Other materials can also be included in the reaction mixture such as color inhibitors, pigments, viscosity stabilizers, and the like.

Although the alkali metal hydroxide can, in some instances, exhibit a promoting effect on the transesterification reaction or the polycondensation reaction, its role should not be confused with that of other well-known transesterification or polycondensation catalysts. To obtain the full beneficial effects of the present invention, the alkali metal hydroxide is used in combination with a transesterification and/or polycondensation catalyst.

The products of the invention are dyeable linear polyesters which can be converted to dyeable films or melt-spun to form filaments and yarns which are dyeable. Operations such as film formation, spinning, dyeing, weaving, etc., are not an integral part of the present invention and can be carried out using technology which is presently well within the skill of the art. The dyeable polyesters of the present invention have a particular affinity for basic dyes.

EXAMPLE I

Into a 2-liter stirred autoclave was charged 384.1 g (1.98 moles) of dimethyl terephthalate, 310 g (5.00 moles) of ethylene glycol, 0.117 g (0.03 weight per cent) of zinc acetate dihydrate, 0.118 g (0.03 weight per cent) of antimony trioxide, and 0.075 g (0.0019 mole) of sodium hydroxide (as a solution in 2 ml methyl alcohol). The temperature of the mixture was increased to about 400° F (204° C) in about 1 hour. During this time methanol evolved from the mixture and was allowed to distill from the autoclave.

At this point in the reaction, 1.0 ml of tris(nonylphenyl) phosphite was added to the system followed by 4.64 g (0.02 mole) of sodium p-phenolsulfonate. A vacuum of about 22 inches was applied to the reactor and the temperature was slowly increased to about 500° F (260° C). The condensation reaction was allowed to proceed for about another 5 and one-half hours, the later portion of which being carried out under a pressure of about 0.1 mm of mercury. During this final stage, excess ethylene glycol was distilled and removed from the reaction zone.

At the completion of the reaction, the polymer was discharged from the reactor, cooled, and subjected to tests to determine its physical properties, particularly those properties important to fiber formation.

A number of other condensation reactions were carried out in essentially the same manner except that the amounts of sodium hydroxide and sodium p-phenolsulfonate were varied. The results of these runs (the above-described run is identified as Run 4) are shown in Table I.

Examination of the runs in Table I shows that the incorporation of even minor amounts of the sodium p-phenolsulfonate into the polyester recipe results in loss of polymer properties, particularly in those properties which are important for fiber formation. More specifically, comparing Run 1 with Run 3 shows that the incorporation of only one mole per cent of the sulfonate increases the diethylene glycol content of the polymer from 1.19 mole per cent to 13.51 mole per cent. This is also reflected in the drastic decrease of inherent viscosity from 0.83 to 0.29 as well as in corresponding decreases in the glass transition temperatures and the melting points of the polymer. Comparing Run 3 with invention Run 4 shows that carrying out the polymerization in the presence of minor amounts of sodium hydroxide substantially restores the losses in desirable properties of the polyester.

TABLE I

PROPERTIES OF POLYESTERS MODIFIED BY SODIUM p-PHENOLSULFONATE

| Run | DMT[1] Moles | PhS[2] Moles | PhS[2] Mole % | NaOH Moles | NaOH Eq. % PhS | Color | I.V.[4] | DEG[5] Mole % | Tg[6] °C | Tm[7] °C |
|---|---|---|---|---|---|---|---|---|---|---|
| 1 | 2.00 | None | 0 | None | None | 0 | .83 | 1.19 | 81 | 259 |
| 2 | 2.00 | None | 0 | .0029 | — | 0 | .82 | 1.00 | 80 | 257 |
| 3 | 1.98 | .02 | 1 | None | — | 3 | .29 | 13.51 | 62 | 233 |
| 4 | 1.98 | .02 | 1 | .0019 | 9.4 | 0 | .66 | 3.78 | 76 | 252 |
| 5 | 1.96 | .04 | 2 | None | — | 1 | .45 | 17.1 | 67 | 233 |
| 6 | 1.96 | .04 | 2 | .0024 | 5.9 | 1 | .47 | 10.3 | 71 | 241 |
| 7 | 1.96 | .04 | 2 | .0029 | 7.3 | 1 | .53 | 6.53 | 73 | 249 |
| 8 | 1.96 | .04 | 2 | .0038 | 9.6 | 0 | .69 | 3.15 | 78 | 254 |
| 9 | 1.96 | .04 | 2 | .0048 | 11.9 | 0 | .64 | 3.57 | 79 | 256 |
| 10 | 1.94 | .06 | 3 | None | — | 2 | .41 | 14.0 | 67 | 233 |
| 11 | 1.94 | .06 | 3 | .0019 | 3.1 | 2 | .40 | 13.2 | 65 | 233 |
| 12 | 1.94 | .06 | 3 | .0035 | 5.9 | 1 | .52 | 10.4 | 71 | 239 |
| 13 | 1.94 | .06 | 3 | .0056 | 9.4 | 0 | .67 | 5.30 | 76 | 251 |
| 14 | 1.94 | .06 | 3 | .0075 | 12.6 | 0 | .59 | 1.27 | 78 | 258 |
| 15 | 1.94 | .06 | 3 | .0094 | 15.7 | 0 | .45 | .53 | 77 | 261 |

NOTES:
[1] DMT = Dimethyl Terephthalate.
[2] PhS = Sodium p-Phenolsulfonate.
[3] 0 = White, 1 = very light tint, 2 = light tint, 3 = medium tint.
[4] I.V. = Inherent Viscosity, 30° C in 60% phenol, 40% tetrachloroethane.
[5] DEG = Diethylene glycol content of polymer.
[6] Tg = Glass transition temperature, by differential thermal analysis, extrapolation back to initial.
[7] Tm = Melting point, by differential thermal analysis, peak melting point reported.

With regard to fiber formation, it is desirable that this polymer be white in color, have an inherent viscosity of about 0.5 to about 0.8 preferably about 0.6, have a diethylene glycol (glycol ether) content of about 4 mole per cent or less, have a glass transition temperature of about 80° C, and have a melting point of about 260° C. Such a combination of properties is substantially present in control Run 1 which contains no phenolsulfonate; but is distinctly absent in comparison Run 3 which utilizes the phenolsulfonate in a manner not according to the invention. The polymer of invention Run 4, on the other hand exhibits properties which are substantially closer to the optimum properties desired.

The beneficial effects of the sodium hydroxide are also seen in the series of Runs from Run 5 through Run 9 and also in the series from Run 10 through Run 15. In Runs 5 and 10, the incorporation of 2 and 3 mole per cent of the sulfonate, respectively, show relatively poor polymer properties. However, invention Runs 6 through 9 and 12 through 15, on the other hand, clearly point out that the desirable properties can be substantially restored if minor amounts of sodium hydroxide are used according to the invention process. Run 11 just outside the scope of the invention, indicated that more sodium hydroxide was required to show a substantial improvement in properties.

Of particular note is the effect of the invention on the diethylene glycol (glycol ether) content of the polymer. Undesirably high levels of diethylene glycol in the polymer are known to adversely affect fiber properties with regard to thermal stability, initial modulus, tenacity, and elongation. The data in Table I show that the use of the phenolsulfonate greatly increases the diethylene glycol content, but that the additional use of an alkali metal hydroxide according to the present invention is effective in reducing the diethylene glycol content.

A sample of polymer from that produced by each of several runs of Example I was pressed into a film of 2–8 mils in thickness. A 1.00 g quantity of each of the films was weighed into a flask as part of a procedure to determine the dyeability of each of these polymers.

Into each flask was added 10 ml of a leveling agent solution (0.250 g of Tanapal ME, per liter) and 10 ml of a dye adjuvant (6.000 g Chemocarrier JL-F, per liter) and with 10 ml of a dye solution. The dye solution contained 1.000 g Astrazon Blue BG-Basic Blue 3, Color Index No. 51005 combined with 5 ml of 10% acetic and diluted to 1 liter.

A 20 ml quantity of deionized water was added to each flask and the solution in each flask was adjusted to a pH of 5.5 with solutions of trisodium phosphate or acetic acid. The mixture was boiled for 120 minutes. The dye solution was drained from the film, the film was washed with several portions of cold water and then dried. The results of the dyeability runs are shown in Table II below:

TABLE II

DYEABILITY OF POLYESTERS MODIFIED BY SODIUM p-PHENOLSULFONATE

| Polyester of Run | PhS Mole % | NaOH Eq. % PhS | Dyed Film Color |
|---|---|---|---|
| 1 | 0 | 0 | Faint Tint |
| 5 | 2 | 0 | Medium Blue |
| 6 | 2 | 5.9 | Medium Blue |
| 7 | 2 | 7.3 | Medium Blue |
| 8 | 2 | 9.6 | Medium Blue |
| 9 | 2 | 11.9 | Medium Blue |

Examination of the data in the above Table will clearly show that the presence of a dye-acceptor, such as sodium p-phenylsulfonate, is necessary to prepare dyeable polyesters and that the presence of sodium hydroxide during the condensation reaction does not destroy this dyeability.

While this invention has been described in detail for the purpose of illustration, it is not to be construed as limited thereby but is intended to cover all changes and modifications within the spirit and scope thereof.

What is claimed is:

1. In a polyesterification process comprising contacting a dicarboxylic acid or its ester forming derivative and a diol under polyester forming conditions, the improvement comprising:
    carrying out at least a part of said polyesterification process in the presence of a. an effective dye receptivity improving amount of a phenolsulfonate represented by the formula

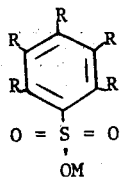

wherein M is an alkali metal and wherein R is selected from hydrogen, hydroxyl or alkyl radicals containing from one to five carbon atoms; and wherein one and only one R is a hydroxyl group; and b. an effective viscosity-modifying amount of an alkali metal hydroxide.

2. In a polyesterification process comprising contacting a dicarboxylic acid or its ester forming derivative and a diol under polyester forming conditions, the improvement comprising:

carrying out at least a part of said esterification process in the presence of a. a phenolsulfonate represented by the formula

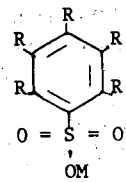

wherein M is an alkali metal and wherein R is selected from hydrogen, hydroxyl or alkyl radicals containing from one to five carbon atoms; and wherein one and only one R is a hydroxyl group, said sulfonate being present in an amount within the range of 1 to 4 mole per cent based upon the total amount of moles of said dicarboxylic acid or its ester forming derivative and said phenol sulfonate; and b. an alkali metal hydroxide in an amount within the range of 5 to 20 equivalent per cent of said phenolsulfonate.

3. A method according to claim 2 wherein said phenolsulfonate is added just prior to a polycondensation stage of said polyesterification reaction.

4. A process according to claim 2 wherein said dicarboxylic acid or its ester forming derivative is a diester of an aromatic diacid and said diol is an aliphatic glycol containing from 2 to 10 carbon atoms per molecule.

5. A method according to claim 2 wherein said alkali metal hydroxide is sodium hydroxide.

6. A method according to claim 2 wherein said phenolsulfonate is selected from the group consisting of potassium m-phenolsulfonate, lithium o-phenolsulfonate, sodium 3,5-dimethyl-4-hydroxy benzenesulfonate, sodium 3-hydroxy-4-n-amylbenzenesulfonate, potassium 2-methyl-4-hydroxy-5-isobutylbenzenesulfonate, sodium 2,3,5,6-tetramethyl-4-hydroxybenzenesulfonate, and the like, and mixtures thereof.

7. A method according to claim 6 wherein said dibasic carboxylic acid or its ester forming derivative is dimethylterephthalate and said glycol is ethylene glycol.

8. A method according to claim 7 wherein said phenolsulfonate is p-phenolsulfonate.

9. A method according to claim 8 wherein said alkali metal hydroxide is sodium hydroxide.

10. A method according to claim 9 wherein said esterification is carried out by heating said ester and said glycol at a temperature in the range of 150° to 270° C to effect an initial ester interchange reaction, and thereafter further heating the mixture to complete the polycondensation and evolve excess glycol from the reaction mixture at a temperature within the range of 200° to 325° C under reduced pressure.

* * * * *